United States Patent
Lee et al.

(10) Patent No.: US 11,114,712 B2
(45) Date of Patent: Sep. 7, 2021

(54) BATTERY MODULE HAVING IMPROVED COOLING STRUCTURE

(71) Applicant: LG CHEM, LTD., Seoul (KR)

(72) Inventors: Yoon-Koo Lee, Daejeon (KR); Mi-Geum Choi, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 106 days.

(21) Appl. No.: 15/554,305

(22) PCT Filed: Sep. 1, 2016

(86) PCT No.: PCT/KR2016/009793
§ 371 (c)(1),
(2) Date: Aug. 29, 2017

(87) PCT Pub. No.: WO2017/039352
PCT Pub. Date: Mar. 9, 2017

(65) Prior Publication Data
US 2018/0053975 A1    Feb. 22, 2018

(30) Foreign Application Priority Data

Sep. 2, 2015 (KR) .................. 10-2015-0124382

(51) Int. Cl.
*H01M 10/647* (2014.01)
*H01M 10/6551* (2014.01)
(Continued)

(52) U.S. Cl.
CPC ....... *H01M 10/647* (2015.04); *H01M 10/613* (2015.04); *H01M 10/6551* (2015.04);
(Continued)

(58) Field of Classification Search
CPC .......... H01M 10/6551; H01M 10/613; H01M 10/647; H01M 2220/30; H01M 10/6554;
(Continued)

(56) References Cited

U.S. PATENT DOCUMENTS

2007/0141452 A1   6/2007   Kim
2007/0292753 A1* 12/2007   Zama .................. H01M 2/0212
                                                  429/181
(Continued)

FOREIGN PATENT DOCUMENTS

CN        202564500 U    11/2012
CN        104335384 A     2/2015
(Continued)

OTHER PUBLICATIONS

English language machine translation of "Battery Module of Improved Colling Efficiency" by Jun-Hui Jeong et al. in KR 10-2014-00339350 (Year: 2014).*
(Continued)

*Primary Examiner* — Jonathan G Jelsma
*Assistant Examiner* — Omar M Kekia
(74) *Attorney, Agent, or Firm* — Birch, Stewart, Kolasch & Birch LLP

(57) ABSTRACT

A battery module having an improved cooling structure according to an embodiment of the present disclosure comprises: a pouch cell laminate comprising a first pouch cell and a second pouch cell located adjacent to the first pouch cell; and cooling fins configured to surround the circumference of an accommodation portion of each of the first pouch cell and the second pouch cell.

9 Claims, 2 Drawing Sheets

(51) Int. Cl.
*H01M 10/613* (2014.01)
*H01M 10/6554* (2014.01)
*H01M 50/116* (2021.01)
*H01M 50/209* (2021.01)
*H01M 50/543* (2021.01)
*H01M 50/557* (2021.01)

(52) U.S. Cl.
CPC ..... *H01M 10/6554* (2015.04); *H01M 50/116* (2021.01); *H01M 50/209* (2021.01); *H01M 50/543* (2021.01); *H01M 50/557* (2021.01); *H01M 2220/30* (2013.01)

(58) Field of Classification Search
CPC ............. H01M 2/0212; H01M 2/0275; H01M 2/1061; H01M 2/021; H01M 50/116; H01M 50/557; H01M 50/543; H01M 50/209; Y02E 60/10
USPC ........................................................ 429/120
See application file for complete search history.

(56) References Cited

U.S. PATENT DOCUMENTS

| | | | | |
|---|---|---|---|---|
| 2012/0171529 | A1* | 7/2012 | Sugita | H01M 2/105 |
| | | | | 429/62 |
| 2013/0011713 | A1* | 1/2013 | Harada | F28F 13/08 |
| | | | | 429/120 |
| 2013/0040175 | A1 | 2/2013 | Yang et al. | |
| 2013/0288100 | A1* | 10/2013 | Dunkel | H01M 10/4207 |
| | | | | 429/120 |
| 2013/0309542 | A1* | 11/2013 | Merriman | B23P 15/26 |
| | | | | 429/120 |
| 2013/0309543 | A1 | 11/2013 | Kim et al. | |
| 2015/0037647 | A1* | 2/2015 | Nguyen | H01M 10/625 |
| | | | | 429/120 |
| 2015/0214569 | A1 | 7/2015 | Kim et al. | |
| 2015/0244043 | A1 | 8/2015 | Yum et al. | |

FOREIGN PATENT DOCUMENTS

| | | | | |
|---|---|---|---|---|
| JP | 2004-47262 | A | 2/2004 | |
| JP | 2004-103258 | A | 4/2004 | |
| JP | 2013-51099 | A | 3/2013 | |
| JP | 2014-509441 | A | 4/2014 | |
| KR | 10-2011-0126765 | A | 11/2011 | |
| KR | 10-2014-0039350 | | * 4/2014 | ............ H01M 10/60 |
| KR | 10-2014-0039350 | A | 4/2014 | |
| KR | 10-2014-0040327 | A | 4/2014 | |
| KR | 10-2015-0049950 | A | 5/2015 | |

OTHER PUBLICATIONS

International Search Report (PCT/ISA/210) issued in PCT/KR2016/009793, dated Dec. 28, 2016.

* cited by examiner

BATTERY MODULE HAVING IMPROVED COOLING STRUCTURE

TECHNICAL FIELD

The present application claims priority to Korean Patent Application No. 10-2015-0124382 filed on Sep. 2, 2015 in the Republic of Korea, the disclosure of which is incorporated herein by reference.

The present disclosure relates to a battery module, and more particularly, to a battery module having an improved cooling structure by optimizing shapes and installation positions of cooling fins.

BACKGROUND ART

With the technical development of mobile devices and the increased demand for the mobile devices, a demand for batteries serving as energy sources has sharply increased. Thus, a vast amount of research into batteries capable of meeting various needs has progressed.

Typically, batteries comprise can-type secondary batteries and pouch-type secondary batteries, which may have small thicknesses and be applied to products, such as mobile phones.

In addition, typical secondary batteries may be classified according to structure of an electrode assembly comprising a positive electrode plate, a negative electrode plate, and a separator. Typically, electrode assemblies may comprise a jelly-roll-type (wind-type) electrode assembly in which long-sheet-type positive electrodes and negative electrodes are wound with a separator interposed therebetween, a stack-type electrode assembly in which a plurality of positive electrodes and negative electrodes that are cut into a predetermined unit size are sequentially stacked with a separator interposed therebetween, and a stack/folding-type electrode assembly in which bi-cells or full cells in which positive electrodes and negative electrodes provided in predetermined units are stacked with a separator interposed therebetween are wound.

Generally, a pouch-type secondary battery comprises a pouch external member, an electrode assembly accommodated in the pouch external member, and an electrode lead electrically connected to the electrode assembly and withdrawn outwardly from the pouch external member.

The pouch external member may be formed to such a size as to accommodate the electrode assembly and the electrode lead, which will be described below.

The electrode assembly comprises a positive electrode plate, a negative electrode plate, and a separator. In the electrode assembly, the positive electrode plate and the negative electrode plate are sequentially stacked with the separator interposed therebetween, forming a stack type or a stack/folding type.

Although the pouch-type secondary battery is usable alone, there are many cases in which a battery module comprising a plurality of electrically connected pouch-type secondary batteries or a battery pack comprising a plurality of connected battery modules is used to increase capacity or output.

Since the battery module or the battery pack is embodied by connecting a plurality of pouch-type secondary batteries, heat generated by the respective secondary batteries may collect, and the generated heat may further increase due to a close-packed structure of the secondary batteries.

Accordingly, in the unit of the battery module or the battery pack, a structure, such as a heat radiation fin configured to radiate heat, may be further provided between every two pouch-type secondary batteries.

However, due to such a combined structure, configuration of the battery module or the battery pack may be complicated. An additional thermal conduction structure is formed between the pouch-type secondary batteries so that the entire size of the battery module or the battery pack may increase. Thus, the battery module or the battery pack may be disadvantageous in terms of energy density, which is a very significant factor in the field of secondary batteries.

DISCLOSURE

Technical Problem

The present disclosure is designed to solve the problems of the related art, and therefore the present disclosure is directed to increasing cooling efficiency of a battery module without reducing energy density of the battery module due to the installation of a structure for cooling.

The technical objectives of the present disclosure are not limited to the above disclosure; other objectives may become apparent to those of ordinary skill in the art based on the following descriptions.

Technical Solution

In one aspect of the present disclosure, there is provided a battery module having an improved cooling structure. The battery module comprises a pouch cell laminate comprising a first pouch cell and a second pouch cell located adjacent to the first pouch cell, and cooling fins configured to surround circumference of an accommodation portion of each of the first pouch cell and the second pouch cell.

The battery module may further comprise a cooling plate located on one side of the pouch cell laminate and configured to contact the cooling fins.

The cooling fins may composed of aluminum.

The cooling fins may be in contact with a sealing portion of each of the first pouch cell and the second pouch cell.

In the battery module, the accommodation portion of the first pouch cell and the accommodation portion of the second pouch cell may be in contact with each other.

The cooling fins may be configured to surround, all at once, the circumferences of the accommodation portions of the first pouch cell and the second pouch cell, which are in contact with each other.

Advantageous Effects

According to the present disclosure, cooling efficiency of a battery module can be improved without reducing energy density of the battery module due to the installation of a structure for cooling.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A battery module according to an embodiment of the present disclosure will be described with reference to FIGS. 1 to 3.

Figure 1:
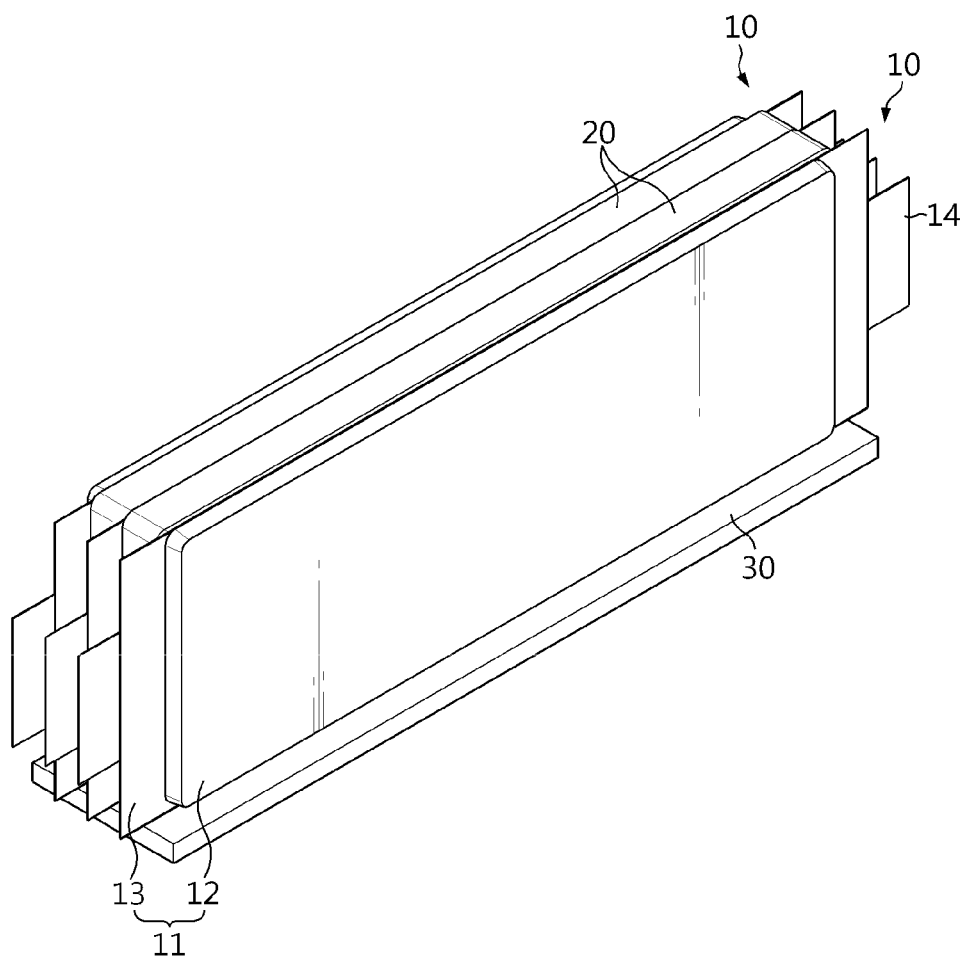
FIG. 1 is a perspective view of a battery module according to an embodiment of the present disclosure.

FIG. 1 is a perspective view of a battery module according to an embodiment of the present disclosure. FIG. 2 is a side view of a battery module according to an embodiment of the present disclosure. FIG. 3 is a plan view of cooling fins installed at a pouch cell applied to a battery module according to an embodiment of the present disclosure.

Figure 2:
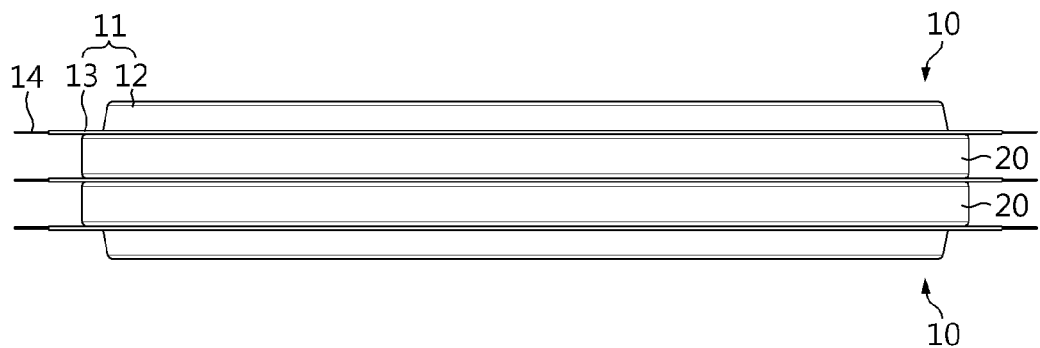
FIG. 2 is a side view of a battery module according to an embodiment of the present disclosure.
Figure 3:
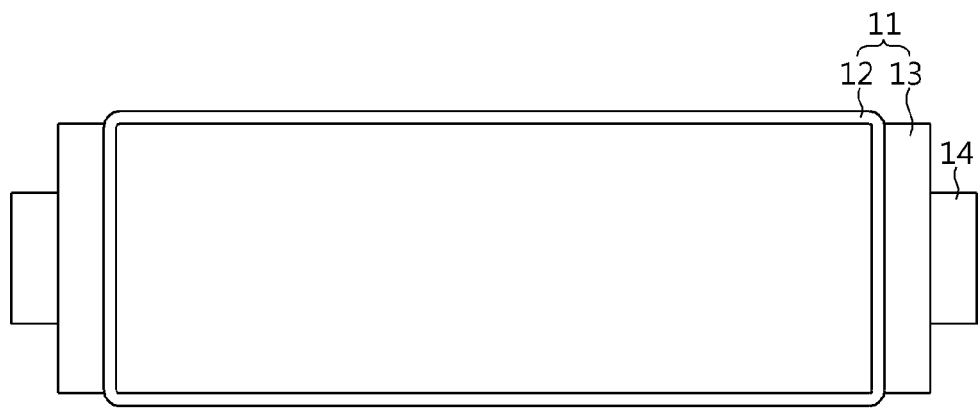
FIG. 3 is a plan view of cooling fins installed at a pouch cell applied to a battery module according to an embodiment of the present disclosure.

Referring to FIGS. 1 to 3, a battery module according to an embodiment of the present disclosure comprises at least two pouch cells 10 and cooling fins 20, and may further comprise a cooling plate 30, which contacts the cooling fins 20.

The pouch cell 10 comprises an electrode assembly (not shown), a pair of electrode leads 14 connected to the electrode assembly, and a pouch case 11 configured to accommodate the electrode assembly and be hermetically sealed with the electrode leads 14 withdrawn outwardly.

The electrode assembly comprises a positive electrode plate, a negative electrode plate, and a separator. The electrode assembly may be embodied by sequentially stacking a positive electrode plate and a negative electrode plate with a separator interposed, at least once. The electrode assembly may have various structures, such as a wind type, a stack type, or a stack/folding type, according to embodiment.

The positive electrode plate applied to the electrode assembly comprises a positive electrode collector composed of a highly conductive metal sheet, for example, aluminum (Al) foil, and a positive electrode active material layer formed on one surface or both surfaces of the positive electrode collector. Also, the positive electrode plate is provided to have a region in which the positive electrode active material layer is not formed, namely, a positive electrode non-coating unit.

The negative electrode plate applied to the electrode assembly comprises a negative electrode collector composed of a highly conductive metal sheet, for example, copper (Cu) foil, and a negative electrode active material layer formed on one surface or two surfaces of the negative electrode collector. Also, the negative electrode plate is provided to have a region in which the negative electrode active material layer is not formed, namely, a negative electrode non-coating unit.

The separator is located between the positive electrode plate and the negative electrode plate and electrically insulates the positive electrode plate and the negative electrode plate from each other. The separator may be formed as a porous film type so that lithium ions may move between the positive electrode plate and the negative electrode plate. The separator may be composed of, for example, a porous film using polyethylene (PE), polypropylene (PP), or a composite film thereof.

The electrode lead 14 is a component, which is connected to the electrode assembly and withdrawn outwardly from the pouch case 11 and configured to connect the electrode assembly with an external component. The electrode lead 14 corresponds to a concept including a positive electrode lead connected to the positive electrode plate and a negative electrode lead connected to the negative electrode plate. More specifically, the positive electrode lead is connected to a positive electrode non-coating unit provided on the positive electrode plate, while the negative electrode lead is connected to a negative electrode non-coating unit provided on the negative electrode plate.

The pouch case 11 composed of a multilayered-film-type external member comprising a metal layer and a resin layer configured to surround the metal layer. The pouch case 11 may include an upper case and a lower case.

When the pouch case 11 includes the upper case and the lower case as described above, each of the upper case and the lower case is provided to have an accommodation portion 12 configured to provide a space in which the electrode assembly is accommodated, and a sealing portion 13 corresponding to an outer circumferential region of the accommodation portion 12.

In this case, the electrode assembly is accommodated in the accommodation portions 12 of the upper case and the lower case, and the sealing portions 13 of the upper case and the lower case are bonded to each other due to thermal fusion while being in contact with each other. Thus, the pouch case 11 is hermetically sealed. An electrolyte may be injected into the pouch case 11 before or after the pouch case 11 is sealed.

Although the present disclosure illustrates only a case in which a pair of electrode leads 14 are withdrawn in opposite directions to each other in each of the pouch cells 10, the present disclosure is not limited thereto. That is, it is clearly revealed that the pouch cell 10 may be embodied by withdrawing a pair of electrode leads 14 in the same direction when necessary.

In addition, although not shown, an adhesive film (not shown) interposed between an inner side surface of the sealing portion 12 and the electrode lead 14 may be further used so that the electrode lead 14 withdrawn outwardly from the pouch case 11 may be easily adhered to the inner side surface of the sealing portion 12.

The cooling fins 20 may be composed of a highly thermally conductive metal material, for example, aluminum (Al).

The cooling fins 20 are in contact with the pouch cell 10 and located to surround the circumference of the accommodation portion 12 of the pouch cell 10 so that heat generated by the pouch cell 10 may be efficiently emitted.

To improve thermal emission effects, the cooling fins 20 may be in contact with not only the accommodation portion 12 but also the sealing portion 13. When the cooling fins 20 are in contact with both the accommodation portion 12 and the sealing portion 13 of the pouch cell 10 as described above, heat generated by the electrode assembly and the electrode lead 14 may be efficiently radiated during a process of using the battery module.

In the process of using the battery module, generated heat concentrates on the electrode lead 14 of the pouch cell (10). When the cooling fins 20 are in contact with the sealing portion 13, heat that has concentrated on the electrode lead 14 withdrawn through the sealing portion 13 may be efficiently distributed so as to improve cooling efficiency.

When the cooling fins 20 are applied to a cell laminate comprising at least two pouch cells 10, the cooling fins 20 may have such a size and shape as to surround, all at once, the circumferences of the accommodation portions 12 of a first pouch cell and a second pouch cell, which are adjacent to each other.

When one of the cooling fins 20 surrounds, all at once, the circumferences of the accommodation portions 12 of the two pouch cells 10, which are adjacent to each other, the battery module is advantageous in terms of both process efficiency and cooling efficiency.

The cooling fins 20 may be in contact with not only the accommodation portion 12 of each of two pouch cells 10, which are adjacent to each other, but also the sealing portion 13 of each of the two pouch cells 10. In this case, as explained above, heat that has concentrated on the electrode pad 14 of each of two pouch cells 10, which are in contact with each other, may be efficiently distributed so as to further increase cooling efficiency.

Although the present disclosure illustrates only an example in which a pouch cell laminate comprises three pouch cells 10 and two cooling fins 20, the present disclosure is not limited thereto.

That is, it is clearly revealed that the pouch cell laminate may comprise two, four, or more pouch cells 10 and thus, one, three, or more cooling fins 20 may be applied to the pouch cell laminate unlike the illustration in the drawings.

The cooling plate 30 is located on one side and/or both sides of a widthwise direction of the pouch cell 10. Here, the widthwise direction of the pouch cell 10 refers to a direction perpendicular to a direction in which the electrode lead (14) is withdrawn, namely, an upward/downward direction on the basis of FIG. 3. The cooling plate 30 is in contact with the cooling fins 20 installed in the pouch cell laminate and radiates heat transmitted through the cooling fins 20.

In view of the functions of the cooling plate 30, the cooling plate 30 may be composed of a highly thermally conductive metal material, for example, an aluminum (Al) material, like the cooling fins 20.

While the present disclosure has been particularly shown and described with reference to exemplary embodiments thereof, it will be understood by those of ordinary skill in the art that it is capable of various changes and modifications without departing from the scope of the present disclosure as defined by the following claims.

What is claimed is:

1. A battery module comprising:
   a pouch cell laminate comprising a first pouch cell and a second pouch cell located adjacent to the first pouch cell, each pouch cell comprising:
      an accommodation portion for containing an electrode assembly, the accommodation portion having a top wall, a bottom wall and a sidewall, the sidewall forming an outer circumference of the accommodation portion;
      a sealing portion extending outwardly from the outer circumference of the accommodation portion; and
      an electrode lead extending outwardly from the sealing portion;
   a first cooling fin having such a size and a shape to contact and surround the sidewall forming the outer circumference of the accommodation portion and contacts the sealing portion of each of the first pouch cell and the second pouch cell; and
   a cooling plate located on one side of the pouch cell laminate and configured to contact the first cooling fin perpendicularly to a planar direction of the first cooling fin,
   wherein the first cooling fin has a first side, a second side, a first end and a second end,
   wherein each pouch cell comprises two electrode leads that extend outwardly from the sealing portion at opposite ends of each pouch cell that correspond to the first end and the second end of the first cooling fin,
   wherein the cooling plate directly contacts the first side of the first cooling fin and the cooling plate does not overlap the two electrode leads that extend outward from the sealing portion.

2. The battery module of claim 1, wherein the first cooling fin is composed of an aluminum material.

3. The battery module of claim 1, wherein the top wall of the accommodation portion of the first pouch cell and the bottom wall of the accommodation portion of the second pouch cell are in contact with each other.

4. The battery module of claim 1, further comprising a third pouch cell, the third pouch cell comprising an accommodation portion for containing an electrode assembly, the accommodation portion having a top wall, a bottom wall and a sidewall, the sidewall forming an outer circumference of the accommodation portion and a sealing portion extending outwardly from the outer circumference of the accommodation portion; and
   a second cooling fin, the second cooling fin contacting and surrounding the sidewall forming the outer circumference of the accommodation portion and contacts the sealing portion of each of the second pouch cell and the third pouch cell.

5. The battery module of claim 4, wherein the second cooling fin has a first side, a second side, a first end and a second end, and
   wherein the cooling plate directly contacts the first side of the second cooling fin.

6. The battery module of claim 4, wherein the first cooling fin simultaneously surrounds the sidewalls forming the outer circumferences of the accommodating portions of the first pouch cell and the second pouch cell, and
   wherein the second cooling fin simultaneously surrounds the sidewalls forming the outer circumferences of the accommodating portions of the second pouch cell and the third pouch cell.

7. The battery module of claim 1, wherein the sealing portion of each pouch cell has a width, and
   wherein a width of the first cooling fin is equal to a width of each pouch cell.

8. The battery module of claim 1, wherein the sealing portion and the two electrode leads extend further outwardly from the first cooling fin only from the first end and the second end, and not from the first side and the second side.

9. The battery module of claim 1, wherein the first cooling fin simultaneously surrounds the sidewalls forming the outer circumferences of the accommodating portions of the first pouch cell and the second pouch cell.

* * * * *